United States Patent
Takehiro et al.

(10) Patent No.: US 10,847,816 B2
(45) Date of Patent: Nov. 24, 2020

(54) FUEL CELL

(71) Applicant: TOYOTA JIDOSHA KABUSHIKI KAISHA, Toyota (JP)

(72) Inventors: Naoki Takehiro, Shizuoka-ken (JP); Makoto Adachi, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 357 days.

(21) Appl. No.: 15/493,187

(22) Filed: Apr. 21, 2017

(65) Prior Publication Data

US 2017/0317362 A1 Nov. 2, 2017

(30) Foreign Application Priority Data

Apr. 28, 2016 (JP) ................... 2016-090730

(51) Int. Cl.
*H01M 8/0267* (2016.01)
*H01M 8/04007* (2016.01)
*H01M 8/04014* (2016.01)
*H01M 8/04119* (2016.01)
*H01M 8/0256* (2016.01)
(Continued)

(52) U.S. Cl.
CPC ..... *H01M 8/04067* (2013.01); *H01M 8/0256* (2013.01); *H01M 8/0265* (2013.01);
(Continued)

(58) Field of Classification Search
CPC .. H01M 8/056; H01M 8/0258; H01M 8/0265; H01M 8/0256; H01M 8/04067;
(Continued)

(56) References Cited

U.S. PATENT DOCUMENTS

2003/0039875 A1\* 2/2003 Horiguchi ........... H01M 8/0206
429/437
2004/0161658 A1 8/2004 Mizuno
(Continued)

FOREIGN PATENT DOCUMENTS

CN 101651217 A 2/2010
CN 103636041 A 3/2014
(Continued)

OTHER PUBLICATIONS

English translation of JP 2009-064772 A (Year: 2009).\*

*Primary Examiner* — Milton I Cano
*Assistant Examiner* — Philip A. Stuckey
(74) *Attorney, Agent, or Firm* — Dickinson Wright PLLC

(57) ABSTRACT

A fuel cell includes a power-generation channel provided on a surface of a cathode-side separator which faces a MEA and a cooling channel provided on a surface of the cathode-side separator opposite to the MEA. Air flows through the power-generation channel and the cooling channel. The cooling channel is separated from the power-generation channel by a side wall. The cross-sectional area of the power-generation channel on the air outlet side is smaller than that of the power-generation channel at a position upstream of the air outlet side, and the cross-sectional area of the cooling channel on the air outlet side is larger than that of the cooling channel at a position upstream of the air outlet side. A through-hole is provided in a side wall that separates the power-generation channel from the cooling channel.

4 Claims, 13 Drawing Sheets

(51) Int. Cl.
*H01M 8/0265* (2016.01)
*H01M 8/04082* (2016.01)
*H01M 8/1004* (2016.01)
*H01M 8/1018* (2016.01)
*H01M 8/0206* (2016.01)

(52) U.S. Cl.
CPC ..... *H01M 8/0267* (2013.01); *H01M 8/04014* (2013.01); *H01M 8/04074* (2013.01); *H01M 8/04119* (2013.01); *H01M 8/04201* (2013.01); *H01M 8/1004* (2013.01); *H01M 8/1018* (2013.01); *H01M 8/0206* (2013.01); *H01M 2008/1095* (2013.01); *Y02E 60/50* (2013.01)

(58) Field of Classification Search
CPC ......... H01M 8/04074; H01M 8/04014; H01M 8/04119; H01M 8/0267; H01M 8/04201; H01M 8/1004; H01M 8/1018; H01M 8/0206; H01M 2008/1095; Y02E 60/50
See application file for complete search history.

(56) References Cited

U.S. PATENT DOCUMENTS

| | | |
|---|---|---|
| 2005/0170223 A1 | 8/2005 | Okazaki |
| 2008/0193812 A1 | 8/2008 | Murata et al. |
| 2010/0028742 A1* | 2/2010 | Jeon ................ H01M 8/0258 429/465 |
| 2011/0244369 A1* | 10/2011 | Kondo ............... H01M 8/0247 429/513 |
| 2013/0011762 A1* | 1/2013 | Matsuda ............ H01M 8/0263 429/457 |
| 2014/0141350 A1 | 5/2014 | Hamada |
| 2014/0227630 A1 | 8/2014 | Hood et al. |
| 2015/0236358 A1* | 8/2015 | Hirata ............... H01M 8/0258 429/529 |
| 2015/0364774 A1* | 12/2015 | Jin .................... H01M 8/0247 429/505 |
| 2016/0141639 A1* | 5/2016 | Nakaji ................ H01M 8/242 429/482 |
| 2018/0175406 A1* | 6/2018 | Kong ................. H01M 8/2465 |

FOREIGN PATENT DOCUMENTS

| | | |
|---|---|---|
| EP | 1 286 404 A2 | 2/2003 |
| JP | 2004-192994 A | 7/2004 |
| JP | 2004-247154 A | 9/2004 |
| JP | 2005-216783 A | 8/2005 |
| JP | 2006-252934 A | 9/2006 |
| JP | 2008-027748 A | 2/2008 |
| JP | 2009064772 A * | 3/2009 |
| JP | 2014-530463 A | 11/2014 |

* cited by examiner

COMPARATIVE EXAMPLE

COMPARATIVE EXAMPLE

COMPARATIVE EXAMPLE

COMPARATIVE EXAMPLE

FUEL CELL

INCORPORATION BY REFERENCE

This application claims priority to Japanese Patent Application No. 2016-090730 filed on Apr. 28, 2016 including the specification, drawings and abstract which is incorporated herein by reference in its entirety.

BACKGROUND

1. Technical Field

The disclosure relates to a fuel cell.

2. Description of Related Art

A polymer electrolyte fuel cell has a structure in which a membrane electrode assembly having catalyst electrode layers provided on the opposite surfaces of an electrolyte membrane is sandwiched between a pair of separators. As a method of cooling the fuel cell, an air cooling method in which oxidant gas supplied for use in electric power generation is used for cooling is known, as well as a water cooling method in which cooling water is circulated. For example, an air-cooled type fuel cell is known which changes the proportion of the amount of air that flows through a channel for cooling and the amount of air that flows through a channel for power generation, according to operating conditions of the fuel cell, so as to achieve effecting cooling without reducing output power (see Japanese Patent Application Publication No. 2006-252934 (JP 2006-252934 A), for example). Also, an air-cooled type fuel cell in which a channel for cooling and a channel for power generation are connected by a through-hole(s) is known (see Japanese Patent Application Publication No. 2008-27748 (JP 2008-27748 A), for example).

SUMMARY

In the air-cooled type fuel cell, the temperature of oxidant gas that flows through a channel rises due to heat generated by electrochemical reactions in the membrane electrode assembly, and a temperature gradient appears along the channel through which the oxidant gas flows. Namely, the temperature is elevated on an outlet side of the channel through which the oxidant gas flows. As a result, the membrane electrode assembly is dried on the outlet side, and the power generation performance is reduced.

The disclosure is to curb reduction of the power generation performance.

The disclosure provides a fuel cell including a membrane electrode assembly, an anode-side separator and a cathode-side separator between which the membrane electrode assembly is sandwiched, a power-generation channel provided on a first surface of the cathode-side separator which faces the membrane electrode assembly, so as to extend from one end to the other end of the cathode-side separator, such that oxidant gas is allowed to flow through the power-generation channel, and a cooling channel provided on a second surface of the cathode-side separator opposite to the membrane electrode assembly, so as to extend from the one end to the other end of the cathode-side separator, such that the oxidant gas is allowed to flow through the cooling channel. The cooling channel and the power-generation channel are separated by a side wall. The cross-sectional area of the power-generation channel on an outlet side on which the oxidant gas is discharged is smaller than the cross-sectional area of the power-generation channel at a position upstream of the outlet side of the power-generation channel, and the cross-sectional area of the cooling channel on an outlet side on which the oxidant gas is discharged is larger than the cross-sectional area of the cooling channel at a position upstream of the outlet side of the cooling channel. A through-hole is provided in the side wall that separates the power-generation channel from the cooling channel.

In the fuel cell as described above, the cross-sectional area of the power-generation channel on an inlet side to which the oxidant gas is supplied may be larger than the cross-sectional area of the power-generation channel on the outlet side, and the cross-sectional area of the cooling channel on an inlet side to which the oxidant gas is supplied may be smaller than the cross-sectional area of the cooling channel on the outlet side.

In the fuel cell as described above, the width of the power-generation channel may change stepwise so as to be reduced in a direction of flow of the oxidant gas that flows through the power-generation channel, and the through-hole may be provided in a stepped portion in which the width changes stepwise, in a direction orthogonal to the direction of flow of the oxidant gas that flows through the power-generation channel.

In the fuel cell as described above, the width of the power-generation channel may change stepwise so as to be reduced in a direction of flow of the oxidant gas that flows through the power-generation channel, and the through-hole may be provided in the vicinity of a stepped portion in which the width changes stepwise.

In the fuel cell as described above, the width of the power-generation channel may change stepwise in a plurality of stepped portions as the stepped portion.

In the fuel cell as described above, the width of the power-generation channel may change linearly so as to be reduced in a direction of flow of the oxidant gas that flows through the power-generation channel, and the through-hole may be provided in an inclined portion in which the width changes linearly.

In the fuel cell as described above, the width of the power-generation channel may change linearly so as to be reduced in a direction of flow of the oxidant gas that flows through the power-generation channel, and the through-hole may be provided in the vicinity of an inclined portion in which the width changes linearly.

In the fuel cell as described above, the cathode-side separator may be formed from a metal plate having recesses and projections.

According to this disclosure, reduction of the power generation performance can be curbed.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Some examples of the disclosure will be described with reference to the drawings.

Figure 1:
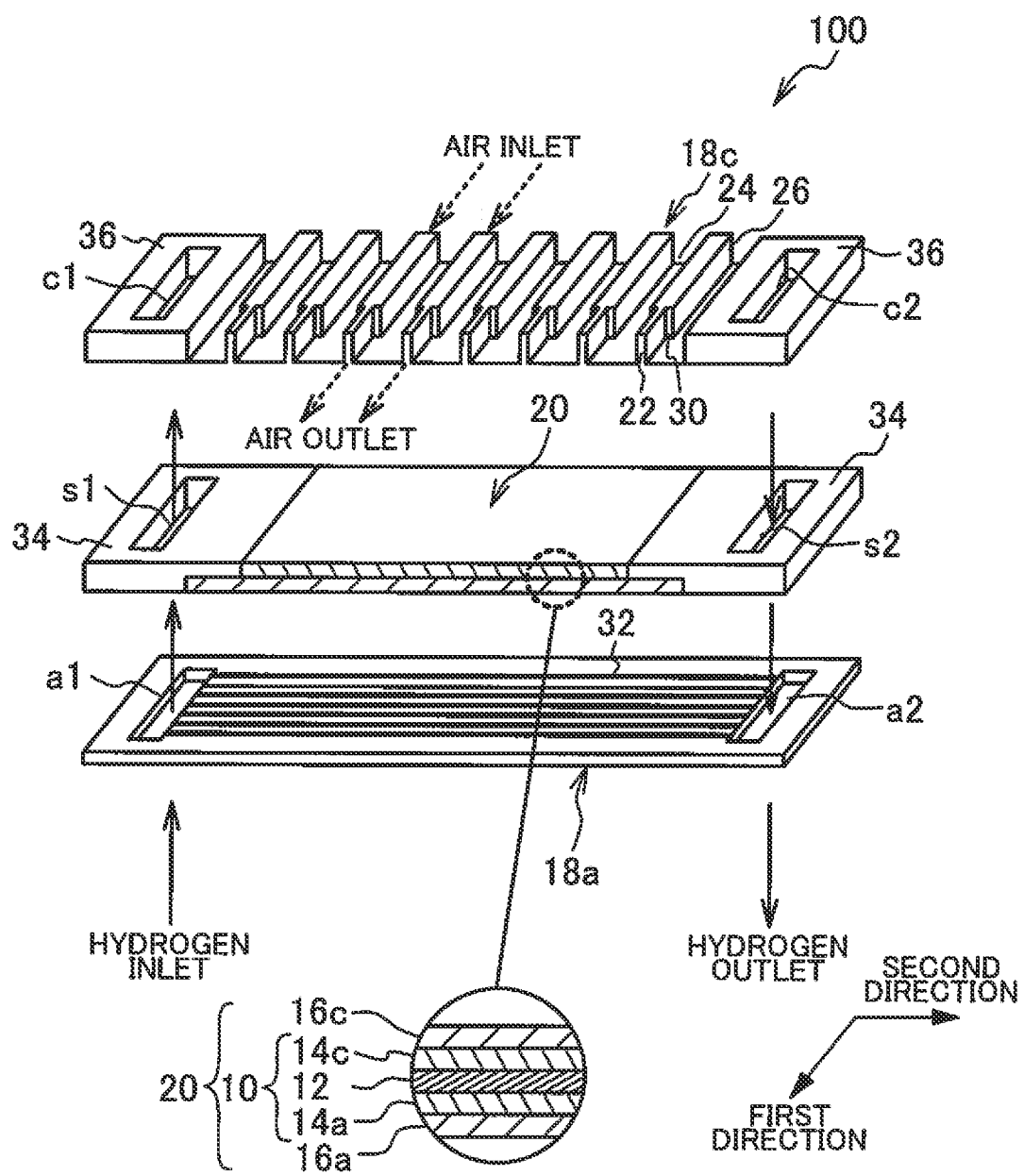
FIG. 1 is an exploded perspective view of a single cell that constitutes a fuel cell according to a first example.
Figure 2:
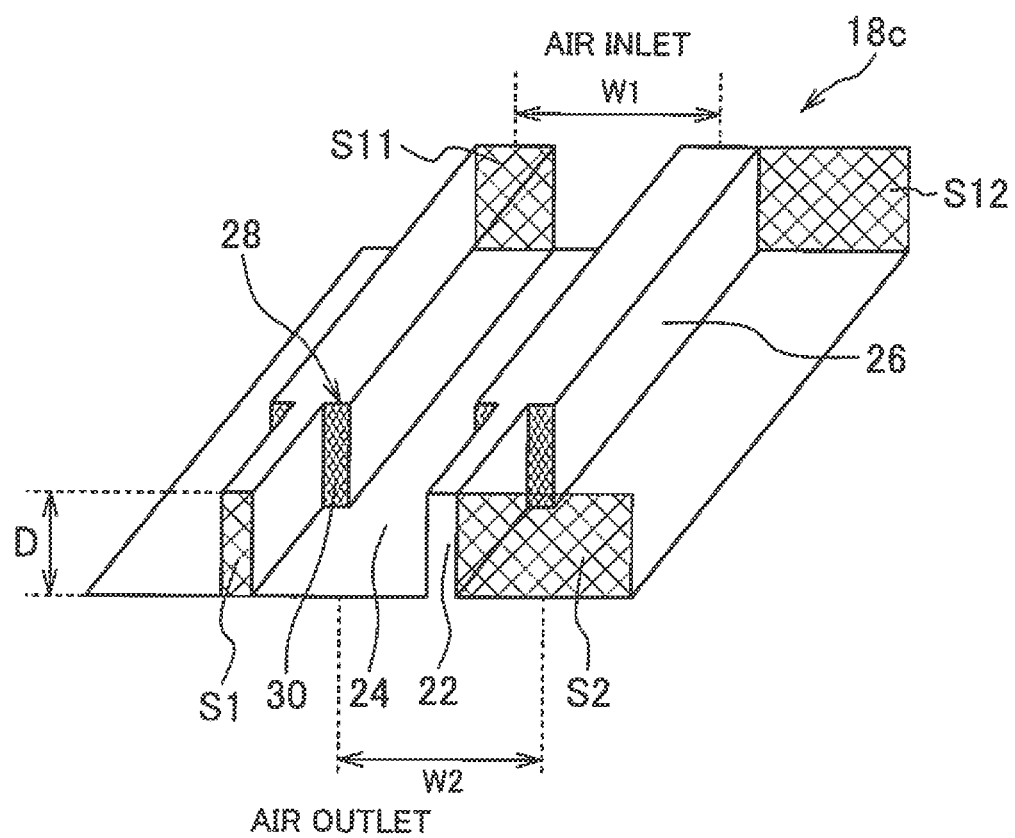
FIG. 2 is an enlarged perspective view of a cathode-side separator shown in FIG. 1.

A fuel cell according to a first example is a polymer electrolyte fuel cell that generates electric power when it is supplied with fuel gas (e.g., hydrogen) as reactant gas and oxidant gas (e.g., air), and has a stack structure formed by stacking a multiplicity of single cells. The fuel cell of the first example is installed on a fuel cell vehicle or an electric vehicle, for example. FIG. 1 is an exploded perspective view of a single cell 100 that constitutes the fuel cell according to the first example. FIG. 2 is an enlarged perspective view of a cathode-side separator 18c shown in FIG. 1.

As shown in FIG. 1 and FIG. 2, the single cell 100 that constitutes the fuel cell of the first example includes an anode-side separator 18a, a membrane electrode gas diffusion layer assembly (MEGA) 20, and a cathode-side separator 18c. The MEGA 20 is disposed inside an insulating member 34 formed of resin (epoxy resin or phenol resin), for example. The MEGA 20 and the insulating member 34 are sandwiched between the anode-side separator 18a and the cathode-side separator 18c.

The cathode-side separator 18c is formed by a member having gas barrier properties and electron conductivity. For example, the cathode-side separator 18c is formed from a metal plate, such as stainless steel, which is formed with recesses and projections by bending through press molding. The cathode-side separator 18c, which is embossed in the thickness direction, is formed with channels 22 for power generation (which will be called "power-generation channels") and channels 24 for cooling (which will be called "cooling channels"), through which air flows. The power-generation channels 22 are provided on one surface of the cathode-side separator 18c which faces the MEGA 20. The cooling channels 24 are provided on the other surface of the cathode-side separator 18c opposite to the MEGA 20. Air supplied to the MEGA 20 flows through the power-generation channels 22, from air inlets or supply ports toward air outlets or discharge ports. Air for cooling the single cell 100 flows through the cooling channels 24, from the air inlets toward the air outlets. The single cell 100 is also cooled by air flowing through the power-generation channels 22.

The power-generation channels 22 and the cooling channels 24 extend in the form of straight lines in a first direction from one end of the cathode-side separator 18c to the other end, and are arranged alternately in a second direction that intersects with the first direction. The power-generation channel 22 has a substantially constant depth D over a range from the air inlet to the air outlet. In other words, the cooling channel 24 has a substantially constant depth D over the range from the air inlet to the air outlet. Also, the pitch or interval W1 (distance between the centers) of the power-generation channels 22 is substantially constant over the range from the air inlets to the air outlets. The pitch or interval W2 (distance between the centers) of the cooling channels 24 is also substantially constant over the range from the air inlets to the air outlets.

The width of the power-generation channel 22 and width of the cooling channel 24 are not constant over the range from the air inlets to the air outlets. The width of the power-generation channel 22 makes a stepwise change, between the air inlet and the air outlet, such that the power-generation channel 22 on the air outlet side is narrower than that on the air inlet side. The width of the cooling channel 24 makes a stepwise change, between the air inlet and the air outlet, such that the cooling channel 24 on the air outlet side is wider than that on the air inlet side. Namely, the cross-sectional area S1 of the power-generation channel 22 on the air outlet side is smaller than the cross-sectional area S11 on the air inlet side, and the cross-sectional area S2 of the cooling channel 24 on the air outlet side is larger than the cross-sectional area S12 on the air inlet side. Each of the side walls 26 that separates the power-generation channels 22 from the cooling channels 24 has a stepped portion 28 at which the widths of the power-generation channel 22 and the cooling channel 24 make stepwise changes. The stepped portion 28 is located closer to the air outlet side than to the air inlet side, for example. Here, the stepped portion 28 denotes a portion of the side wall 26 which is orthogonal to the direction of flow of air.

Though-holes 30 that communicate the power-generation channels 22 with the cooling channels 24 are provided in the stepped portions 28 of the side walls 26. The through-holes 30 are provided in a direction orthogonal to the direction of flow of air that flows through the power-generation channels 22. With the through-holes 30 thus provided, a part of the air flowing through the power-generation channels 22 from the air inlets toward the air outlets flows into the cooling channels 24.

The anode-side separator 18a is formed by a member having gas barrier properties and electron conductivity. For example, the anode-side separator 18a is formed by a carbon member, such as high-density carbon, formed by compressing carbon so as to make it gas-impermeable, or a metal member, such as stainless steel. The anode-side separator 18a is provided with holes a1, a2, and the insulating member 34 is provided with holes s1, s2, while insulating members 36 provided on the opposite sides of the cathode-side separator 18c are provided with holes c1, c2. The holes a1, s1, c1 communicate with each other, and define a supply manifold through which hydrogen is supplied. The holes a2, s2, c2 communicate with each other, and define a discharge manifold through which hydrogen is discharged. On one surface of the anode-side separator 18a which faces the MEGA 20, hydrogen channels 32 through which hydrogen supplied to the MEGA 20 flows are provided, such that the channels 32 extend in the form of straight lines from the supply manifold toward the discharge manifold. The hydrogen channels 32 intersect (at right angles, for example) with the power-generation channels 22 and the cooling channels 24.

The MEGA 20 includes an electrolyte membrane 12, anode catalyst layer 14a, cathode catalyst layer 14c, anode gas diffusion layer 16a, and a cathode gas diffusion layer 16c. The anode catalyst layer 14a is provided on one surface of the electrolyte membrane 12, and the cathode catalyst layer 14c is provided on the other surface. Thus, a membrane electrode assembly (MEA) 10 is formed. The electrolyte membrane 12 is a solid polymer membrane formed of a fluorine-containing resin material having a sulfonate group, or a hydrocarbon-containing resin material, and has good protonic conductivity in a wet condition. The anode catalyst layer 14a and the cathode catalyst layer 14c include carbon particles (such as carbon black) that support a catalyst (such as platinum, or an alloy of platinum and cobalt) that promotes electrochemical reactions, and ionomer that is a solid polymer having a sulfonate group, and has good protonic conductivity in a wet condition.

The anode gas diffusion layer 16a and the cathode gas diffusion layer 16c are disposed on the opposite sides of the MEA 10. The anode gas diffusion layer 16a and the cathode gas diffusion layer 16c are formed by members having gas permeability and electron conductivity, for example, formed by porous carbon members, such as carbon cloths or carbon papers. Water repellent layers may be provided between the MEA 10 and the anode gas diffusion layer 16a and between the MEA 10 and the cathode gas diffusion layer 16c, for the purpose of adjusting the amount of water or moisture contained in the MEA 10. Like the anode gas diffusion layer 16a and the cathode gas diffusion layer 16c, the water repellent layers are formed by members having gas permeability and electron conductivity, for example, formed by porous carbon members, such as carbon cloths or carbon papers. However, the porous carbon member of the water repellent layer has fine pores that are smaller than those of the anode gas diffusion layer 16a and the cathode gas diffusion layer 16c.

Figure 3:
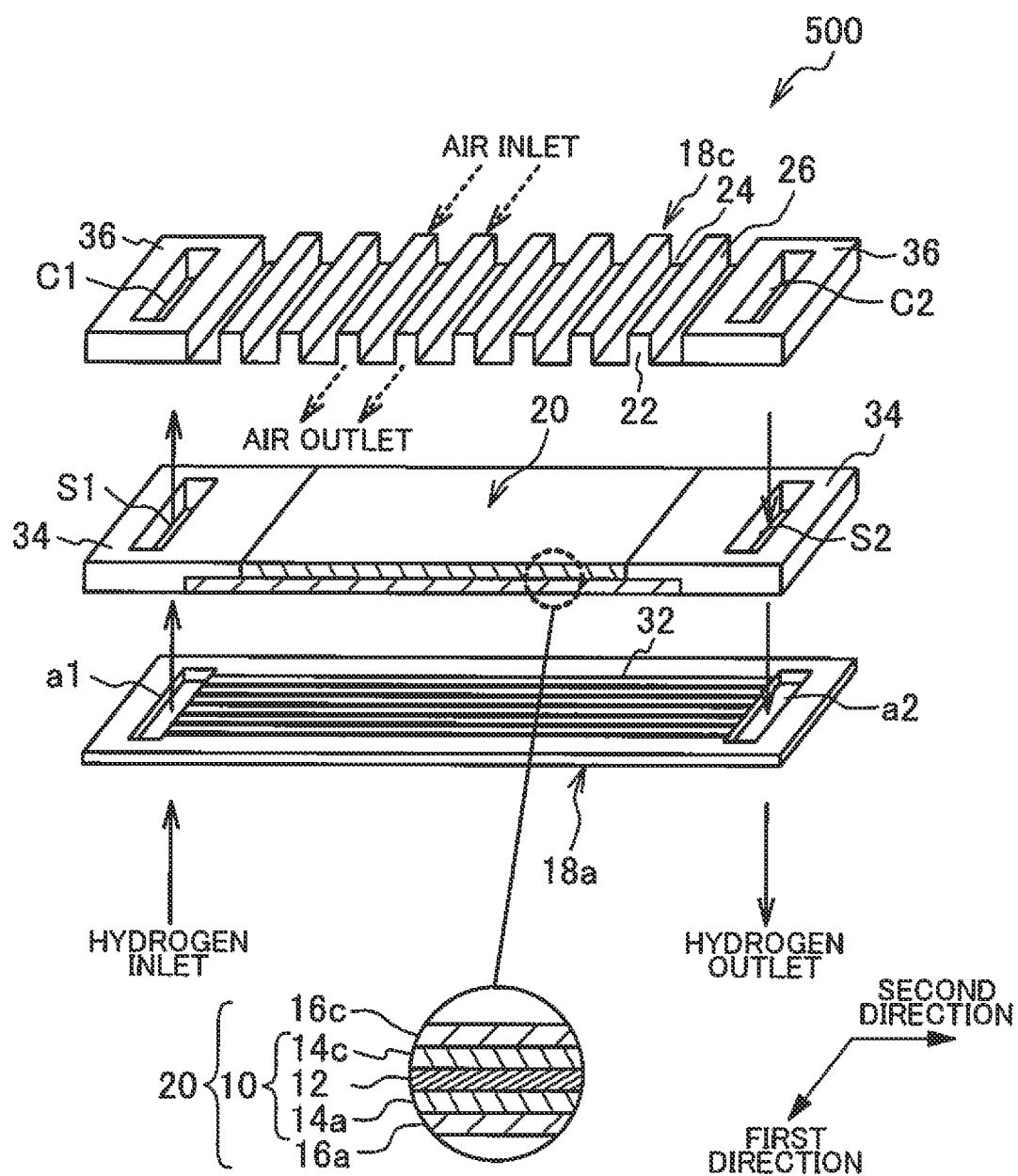
FIG. 3 is an exploded perspective view of a single cell that constitutes a fuel cell according to a comparative example.

Here, a fuel cell according to a comparative example will be described, before the effect of the fuel cell according to the first example is explained. FIG. 3 is an exploded perspective view of a single cell 500 that constitutes the fuel cell according to the comparative example. As shown in FIG. 3, in the single cell 500 that constitutes the fuel cell of the comparative example, the widths of the power-generation channels 22 and the cooling channels 24 of the cathode-side separator 18c are constant over a range from air inlets to air outlets. Namely, the cross-sectional area of each power-generation channel 22 is constant over a range from its air inlet to its air outlet. The cross-sectional area of each cooling channel 24 is also constant over a range from its air inlet to its air outlet. Also, no through-holes are provided in side walls 26 that separate the power-generation channels 22 from the cooling channels 24. The other configuration of the comparative example is identical with that of the first example, and therefore, will not be described.

Figure 4:
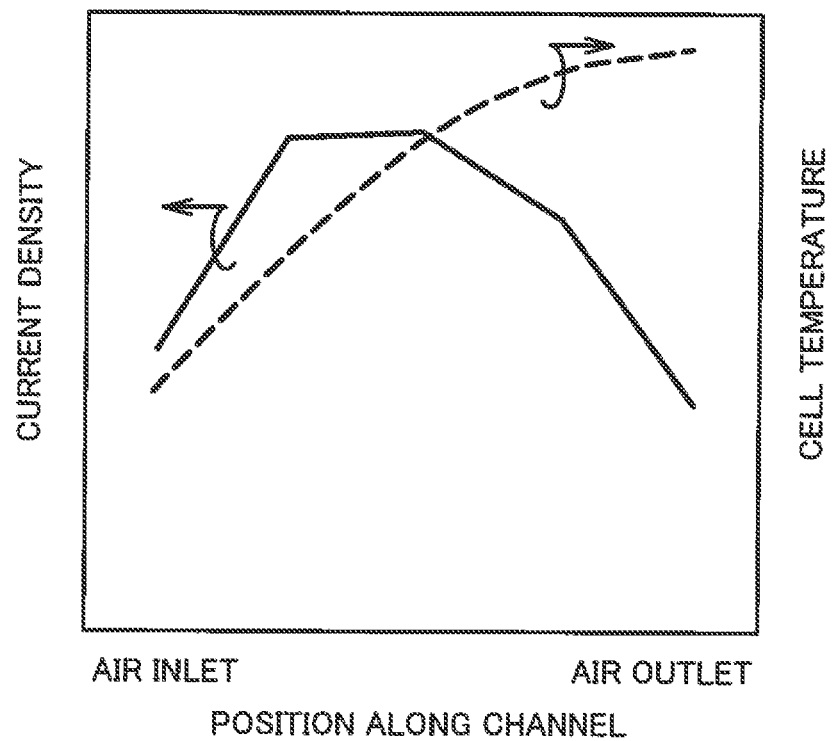
FIG. 4 is a graph showing the generated power distribution and temperature distribution of the single cell of the comparative example.

FIG. 4 is a graph showing the generated power distribution and temperature distribution of the single cell 500 of the comparative example. In FIG. 4, the horizontal axis indicates the position along the power-generation channels 22 and the cooling channels 24, and the left vertical axis indicates the current density of the single cell 500, while the right vertical axis indicates the temperature of the single cell 500. FIG. 4 shows the current density of the single cell 500 when hydrogen that has been humidified to a dew-point temperature of 50 C flows through the hydrogen channels 32. FIG. 4 also shows the cell temperature at the time when the current density of the single cell 500 is equal to 1.0 A/cm$^2$, in the case where hydrogen humidified to the dew-point temperature of 50 C flows through the hydrogen channels 32.

It is understood from FIG. 4 that the cell temperature increases from the air inlet to the air outlet as indicated by the dotted line. It is also understood that the current density is reduced on the air inlet side and the air outlet side, as compared with that between the air inlet and the air outlet as shown by the solid line.

Figure 5:
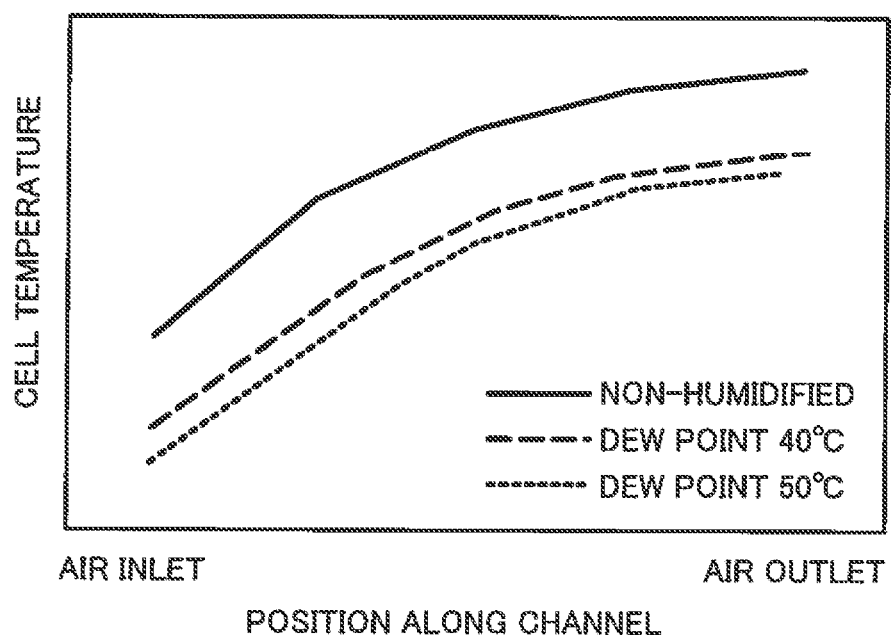
FIG. 5 is a graph showing the temperature distribution of the single cell of the comparative example, in the case where the humidified state of hydrogen is changed.

FIG. 5 is a graph showing the temperature distribution of the single cell 500 of the comparative example, when the humidified state of hydrogen is changed. In FIG. 5, the horizontal axis indicates the position along the power-generation channels 22 and the cooling channels 24, and the vertical axis indicates the temperature of the single cell 500. FIG. 5 shows the cell temperature at the time when the current density of the single cell 500 is equal to 1.0 A/cm$^2$, in the case where non-humidified hydrogen flows through the hydrogen channels 32, the case where hydrogen humidified to a dew-point temperature of 40 C flows through the hydrogen channels 32, and the case where hydrogen humidified to a dew-point temperature of 50 C flows through the hydrogen channels 32. The conditions of air flowing through the power-generation channels 22 and the cooling channels 24 are equal in all of the cases. In FIG. 5, the solid line indicates the case where non-humidified hydrogen flows, and the broken line indicates the case where hydrogen humidified to the dew-point temperature of 40 C flows, while the dotted line indicates the case where hydrogen humidified to the dew-point temperature of 50 C flows.

It is understood from FIG. 5 that, even when the humidified state of hydrogen flowing through the hydrogen channels 32 changes, the cell temperature increases from the air inlet side to the air outlet side. The reason why the cell temperature increases from the air inlet side to the air outlet side may be considered as follows. Namely, the temperature of air flowing through the power-generation channels 22 and the cooling channels 24 increases due to heat generated by electrochemical reactions in the MEA 10. Therefore, the cooling performance is reduced on the air outlet side as compared with that on the air inlet side. Accordingly, it is considered that the cell temperature increases from the air inlet side to the air outlet side. When the fuel cell is installed on a fuel cell vehicle or electric vehicle, the size of the fuel cell is restricted by the installation space of the vehicle. Therefore, in order to generate large electric power, it is desired to increase the length of a power generating portion as measured in a direction along the power-generation channels 22 and the cooling channels 24. In this case, the temperature gradient or difference increases along the power-generation channels 22 and the cooling channels 24, and the cell temperature on the air outlet side becomes higher.

Figure 6:
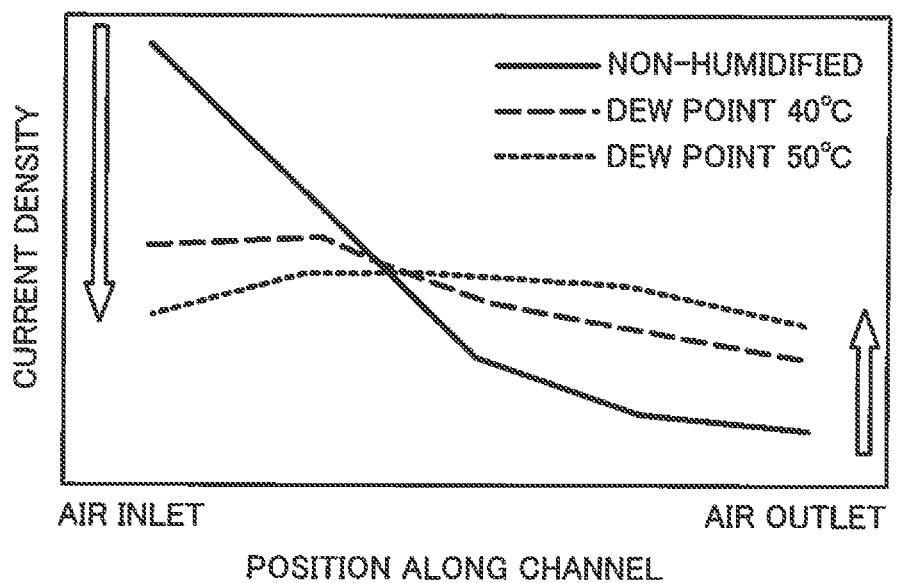
FIG. 6 is a graph showing the generated power distribution of the single cell of the comparative example, in the case where the humidified state of hydrogen is changed.

FIG. 6 is a graph showing the generated power distribution of the single cell 500 of the comparative example, when the humidified state of hydrogen is changed. In FIG. 6, the horizontal axis indicates the position along the power-generation channels 22 and the cooling channels 24, and the vertical axis indicates the current density of the single cell 500. In FIG. 6, the solid line indicates the case where non-humidified hydrogen flows through the hydrogen channels 32, and the broken line indicates the case where hydrogen humidified to the dew-point temperature of 40 C flows, while the dotted line indicates the case where hydrogen humidified to the dew-point temperature of 50 C flows. The conditions of air flowing through the power-generation channels 22 and the cooling channels 24 are equal in all of the cases.

It is understood from FIG. 6 that, on the air inlet side, the current density is reduced as the degree of humidification of hydrogen flowing through the hydrogen channels 32 increases. The reason for this phenomenon may be considered as follows. Namely, since the cooling effect by air is high on the air inlet side, the cell temperature is reduced. Therefore, the saturated vapor pressure of water is lowered, and water produced by electrochemical reactions in the MEA 10 is discharged in the form of liquid water. Namely, the liquid water is likely to be retained in the MEA 10 on the air inlet side. Accordingly, it may be considered that, if humidified hydrogen is supplied to the hydrogen channels 32, flooding due to excessive liquid water in the MEA 10 takes place, resulting in reduction of the power generation performance. In this connection, if the cell temperature is reduced, electrochemical reactions are less likely to be promoted by the catalyst, and the power generation performance is reduced. However, since the power generation performance changes as the degree of humidification of hydrogen changes, the excessive liquid water in the MEA 10 may be considered as a cause of the reduction of the power generation performance, as described above.

On the other hand, it is understood from FIG. 6 that, on the air outlet side, the current density increases as the degree of humidification of hydrogen flowing through the hydrogen channels 32 increases. The reason for this phenomenon may be considered as follows. Namely, on the air outlet side, the cooling effect by air is reduced, and the cell temperature is increased. Therefore, the saturated vapor pressure of water is elevated, and water produced by electrochemical reactions in the MEA 10 is quickly discharged by air in the form of water vapor. Namely, on the air outlet side, the liquid water is less likely or unlikely to be retained in the MEA 10, and the MEA 10 is likely to be dry. Accordingly, it may be considered that, if humidified hydrogen is supplied to the hydrogen channels 32, the drying of the MEA 10 is reduced, resulting in increase of the power generation performance.

As shown in FIG. 3, the power generation channels 22 and the cooling channels 24 intersect (at right angles, for example) with the hydrogen channels 32. Therefore, hydrogen flowing through the hydrogen channels 32 is in the same state on the air inlet side and the air outlet side. Accordingly, the generated power distribution in the direction along the power-generation channels 22 and the cooling channels 24 is considered to be caused by the air flowing through the power-generation channels 22 and the cooling channels 24.

Thus, when the cross-sectional area of the power-generation channel 22 is constant over the range from the air inlet to the air outlet, the power generation performance may be reduced due to flooding caused by excessive liquid water including the produced water on the air inlet side. Also, on the air outlet side, the power generation performance may be reduced due to increase of the resistance of the electrolyte membrane 12 caused by drying of the MEA 10.

On the other hand, according to the first example, the cross-sectional area of the power-generation channel 22 on the air outlet side is smaller than the cross-sectional area on the upstream side, and the cross-sectional area of the cooling channel 24 on the air outlet side is larger than the cross-sectional area on the upstream side. Further, the through-holes 30 are provided in the side walls 26 that separate the power-generation channels 22 from the cooling channels 24. By reducing the cross-sectional area of the power-generation channel 22 on the air outlet side, it is possible to reduce the amount of air that contacts with the MEGA 20 on the air outlet side, and restrain the air from taking away the liquid water from the MEA 10. Also, by increasing the cross-sectional area of the cooling channel 24 on the air outlet side, and providing the through-holes 30 so that the air flows from the power-generation channels 22 into the cooling channel 24, reduction of the cooling performance on the air outlet side can be curbed. With these arrangements, drying of the MEA 10 on the air outlet side can be lessened, and reduction of the power generation performance on the air outlet side can be curbed.

Also, according to the first example, as shown in FIG. 2, the cross-sectional area of the power-generation channel 22 on the air inlet side is larger than that on the air outlet side, and the cross-sectional area on the air inlet side of the cooling channel 24 is smaller than that on the air outlet side. By increasing the cross-sectional area of the power-generation channel 22 on the air inlet side, and providing the through-holes 30 so as to ensure flow of air from the power-generation channels 22 into the cooling channels 24, it is possible to increase the amount of air flowing through the power-generation channels 22 on the air inlet side. With this arrangement, the amount of air that contacts with the MEGA 20 on the air inlet side can be increased, and discharge of liquid water from the MEA 10 can be promoted. Accordingly, the amount of liquid water in the MEA 10 is less likely to be excessively large on the air inlet side, and reduction of the power generation performance on the air inlet side can be curbed.

Also, according to the first example, as shown in FIG. 1, the channels 22 for power generation and the channels 24 for cooling are arranged in the second direction that intersects with the first direction as the direction of flow of air that flows through the channels 22 for power generation and the channels 24 for cooling. With this arrangement, the channels 24 for cooling can be located close to the cathode catalyst layer 14c, and the cooling efficiency can be improved.

Also, according to the first example, as shown in FIG. 2, the width of the power-generation channel 22 changes stepwise so as to be reduced in the direction of flow of air that flows through the power-generation channel 22. The through-holes 30 are provided in a direction orthogonal to the direction of flow of air that flows through the power-generation channel 22, in the stepped portions 28 at which the width of the power-generation channel 22 changes stepwise. With this arrangement, the air smoothly flows from the power-generation channels 22 into the cooling channels 24.

Also, according to the first example, the cathode-side separator 18c is formed by the metal plate formed with recesses and projections. Thus, the cathode-side separator 18c has a simple structure, which leads to improvement of the productivity and reduction of the manufacturing cost. The cathode-side separator 18c may also be formed by a carbon member, such as high-density carbon, which is formed by compressing carbon and making it gas-impermeable, for example.

Figure 7:
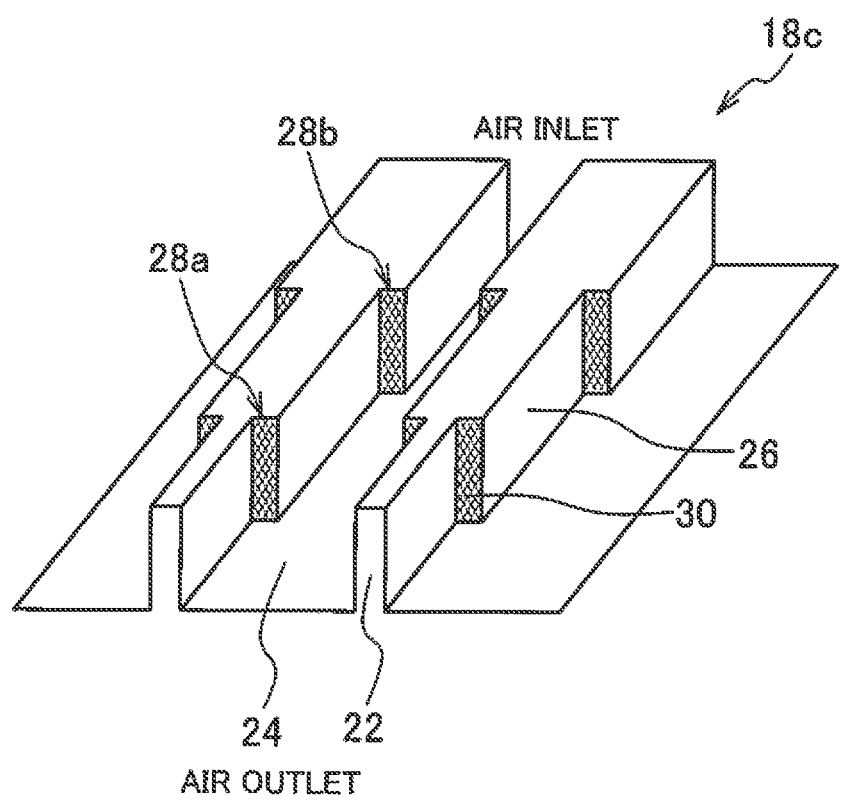
FIG. 7 is an enlarged perspective view of a cathode-side separator of a single cell that constitutes a fuel cell according to a second example.

FIG. 7 is an enlarged perspective view of a cathode-side separator 18c of a single cell that constitutes a fuel cell according to a second example. As shown in FIG. 7, in the cathode-side separator 18c of the single cell of the second example, the widths of the power-generation channel 22 and the cooling channel 24 change in three stages. Namely, the cross-sectional areas of the power-generation channel 22 and the cooling channel 24 change in three stages. The cross-sectional area of the power-generation channel 22 is the largest on the air inlet side, then the second largest in a region between the air inlet and the air outlet, and is the smallest on the air outlet side. The cross-sectional area of the cooling channel 24 is the smallest on the air inlet side, then the second largest in a region between the air inlet and the air outlet, and is the largest on the air outlet side. Through-holes 30 are provided in the side walls 26 of the two stepped portions 28a, 28b at which the widths of the power-generation channel 22 and the cooling channel 24 are changed. The other configuration is identical with that of the first example, and therefore, will not be described.

According to the second example, the two or more stepped portions 28a, 28b at which the width of the power-generation channel 22 changes are provided, and the through-holes 30 are provided in the respective stepped portions 28a, 28b. With this arrangement, an appropriate amount of air can be caused to flow through each of the regions into which the power-generation channel 22 is divided.

Figure 8A:
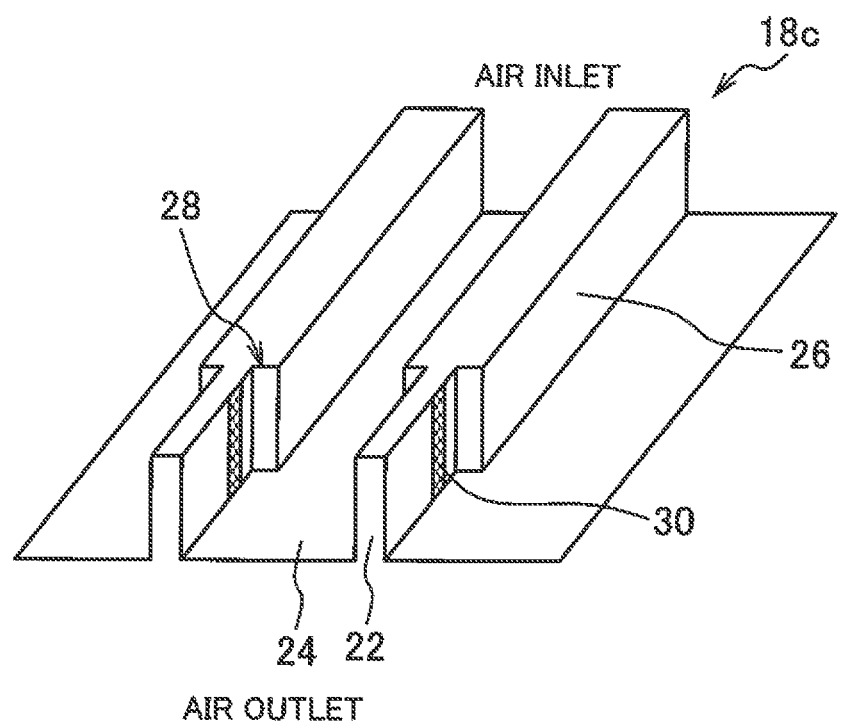
FIG. 8A is an enlarged perspective view of a cathode-side separator of a single cell that constitutes a fuel cell according to a third example.
Figure 8B:
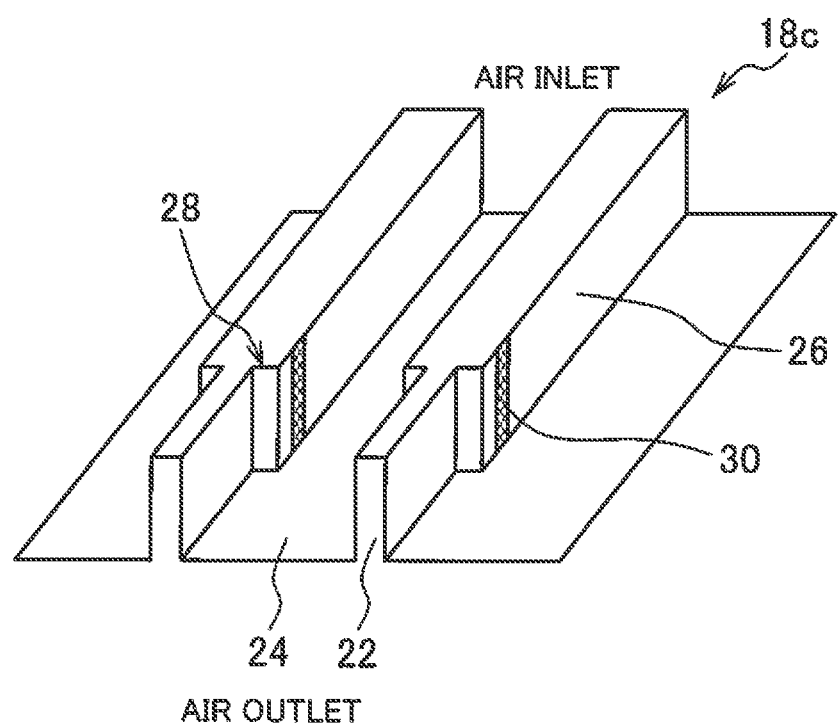
FIG. 8B is an enlarged perspective view of a cathode-side separator of a single cell that constitutes a fuel cell according to a first modified example of the third example.

FIG. 8A is an enlarged perspective view of a cathode-side separator 18c of a single cell that constitutes a fuel cell according to a third example, and FIG. 8B is an enlarged perspective view of a cathode-side separator 18c of a single cell that constitutes a fuel cell according to a first modified example of the third example. As shown in FIG. 8A, in the cathode-side separator 18c of the single cell of the third example, through-holes 30 are provided in the side walls 26 on the downstream side of the stepped portions 28 as viewed in the direction of flow of air, in the vicinity of the stepped portions 28 at which the widths of the power-generation channel 22 and the cooling channel 24 change. The through-holes 30 are formed in parallel with the direction of flow of air that flows through the power-generation channel 22. The other configuration is identical with that of the first example, and therefore, will not be described.

In the third example, the through-holes 30 are provided in the vicinity of the stepped portions 28. Since the cross-sectional area of the power-generation channel 22 is reduced at the stepped portion 28, the flow of air in the power-generation channel 22 stagnates at around the stepped portions 28; as a result, the pressure around the stepped portions 28 rises. With the through-holes 30 thus provided in the vicinity of the stepped portions 28 where the pressure in the power-generation channel 22 rises, the air is allowed to flow from the power-generation channels 22 into the cooling channels 24. As is apparent from the above description, the vicinity of the stepped portions 28 means a range in which the flow of air in the power-generation channel 22 stagnates and the pressure rises, and a range in which the pressure in the power-generation channel 22 is higher than the pressure in the cooling channel 24.

While the through-holes 30 are provided in the side walls 26 on the downstream side of the stepped portions 28 as viewed in the direction of flow of air, the embodiment is not limited to this arrangement. As shown in FIG. 8B, the through-holes 30 may be provided in the side walls 26 in the vicinity of the stepped portions 28, on the upstream side of the stepped portions 28 as viewed in the direction of flow of air. Also, the through-holes 30 may be provided on the upstream and downstream sides of the stepped portions 28, as in a fifth example that will be described later.

Figure 9A:
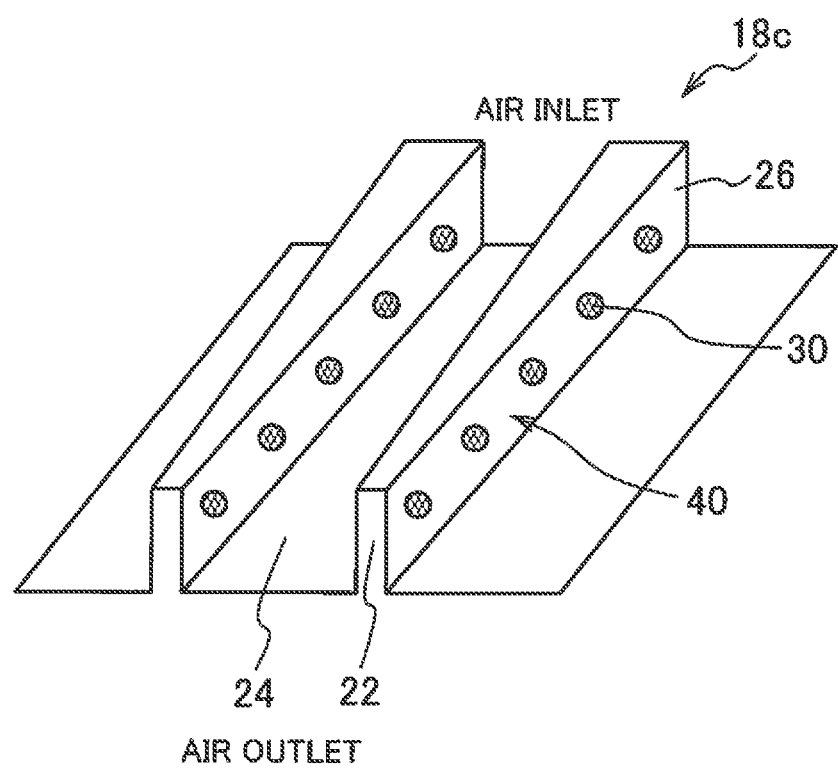
FIG. 9A is an enlarged perspective view of a cathode-side separator of a single cell that constitutes a fuel cell according to a fourth example.
Figure 9B:
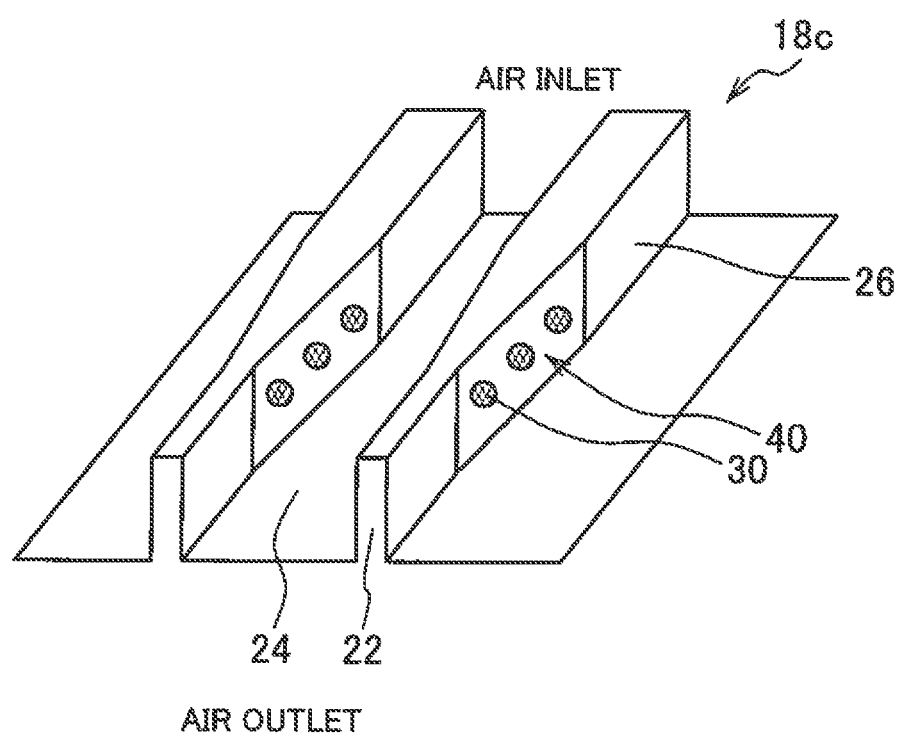
FIG. 9B is an enlarged perspective view of a cathode-side separator of a single cell that constitutes a fuel cell according to a first modified example of the fourth example.

FIG. 9A is an enlarged perspective view of a cathode-side separator 18c of a single cell that constitutes a fuel cell according to a fourth example, and FIG. 9B is an enlarged perspective view of a cathode-side separator 18c of a single cell that constitutes a fuel cell according to a first modified example of the fourth example. As shown in FIG. 9A, in the cathode-side separator 18c of the single cell of the fourth example, the width of each power-generation channel 22 linearly changes (in tapered form) so as to be smaller on the air outlet side than that on the air inlet side. The width of each cooling channel 24 linearly changes (in tapered form) so as to be larger on the air outlet side than that on the air inlet side. Through-holes 30 are provided in inclined portions 40 along which the widths of the power-generation channel 22 and the cooling channel 24 linearly change. The other configuration is identical with that of the first example, and therefore, will not be described.

According to the fourth example, the width of the power-generation channel 22 linearly changes so as to be reduced in the direction of flow of air that flows through the power-generation channel 22. The through-holes 30 are provided in the inclined portions 40 along which the width of the power-generation channel 22 linearly changes. In this case, too, air is allowed to flow from the power-generation channels 22 into the cooling channels 24.

In the fourth example, the width of the power-generation channel 22 linearly changes over the entire region from the air inlet to the air outlet. However, the embodiment is not limited to this arrangement. As shown in FIG. 9B, the width of the power-generation channel 22 may linearly change, in a part of the region between the air inlet and the air outlet.

In the fourth example, it is preferable to provide two or more through-holes 30 in the inclined portion 40 along the direction of flow of air that flows through the power-generation channel 22. With this arrangement, the air that flows in the power-generation channels 22 is allowed to flow little by little into the cooling channels 24 through the two or more through-holes 30.

Figure 10:
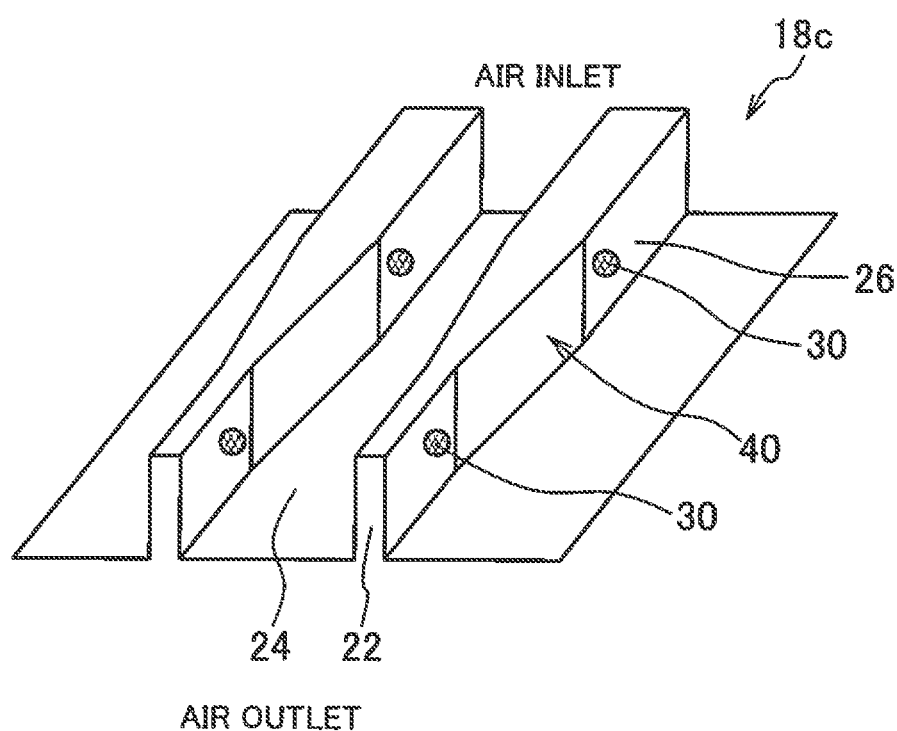
FIG. 10 is an enlarged perspective view of a cathode-side separator of a single cell that constitutes a fuel cell according to a fifth example.

FIG. 10 is an enlarged perspective view of a cathode-side separator 18c of a single cell that constitutes a fuel cell according to a fifth example. As shown in FIG. 10, in the cathode-side separator 18c of the single cell of the fifth example, the widths of the power-generation channel 22 and the cooling channel 24 change in the inclined portions 40, and the through-holes 30 are provided in the side walls 26 on the upstream side and downstream side of the inclined portions 40 as viewed in the direction of flow of air, in the vicinity of the inclined portions 40. The through-holes 30 are provided in parallel with the direction of flow of air that flows through the power-generation channel 22. The other configuration is identical with that of the first example, and therefore, will not be described.

In the fifth example, the through-holes 30 are provided in the vicinity of the inclined portions 40. As in the third example, the pressure in the power-generation channel 22 rises in the vicinity of the inclined portions 40; therefore, the provision of the through-holes 30 in the vicinity of the inclined portions 40 makes it possible to produce flow of air from the power-generation channels 22 into the cooling channels 24. Like the vicinity of the stepped portions 28 in the third example, the vicinity of the inclined portions 40 means a range in which the flow of air in the power-generation channel 22 stagnates and the pressure rises, and a range in which the pressure in the power-generation channel 22 is higher than the pressure in the cooling channel 24.

In the fifth example, the through-holes 30 are provided on both the upstream side and the downstream side of the inclined portions 40. However, the embodiment is not limited to this arrangement. The through-holes 30 may be provided only on the downstream side of the inclined portions 40, as in the third example, or the through-holes 30 may be provided only on the upstream side of the inclined portions 40, as in the first modified example of the third example.

Figure 11:
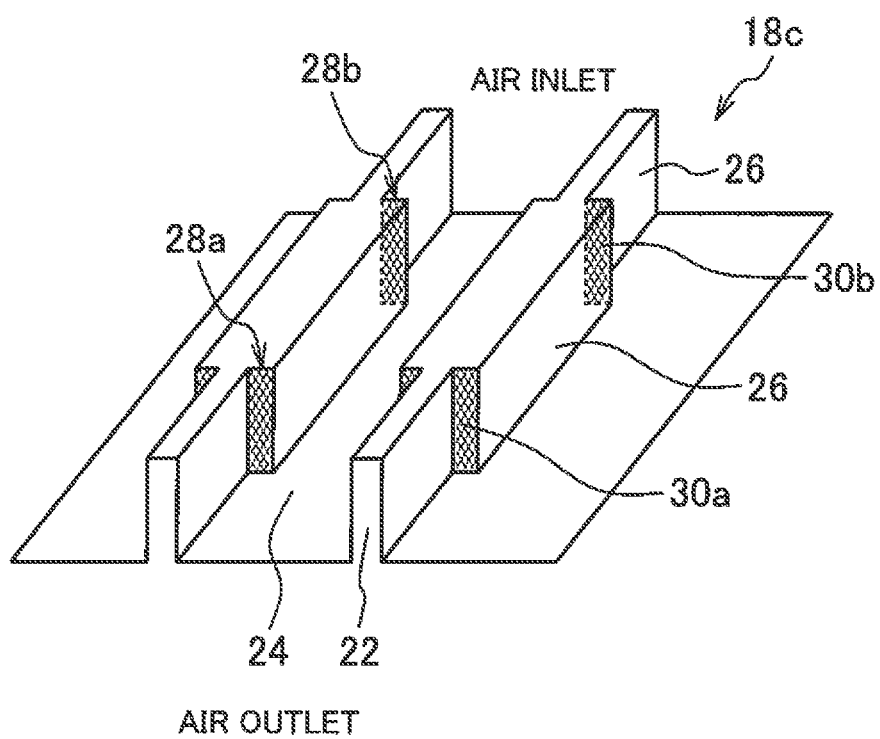
FIG. 11 is an enlarged perspective view of a cathode-side separator of a single cell that constitutes a fuel cell according to a sixth example.

FIG. 11 is an enlarged perspective view of a cathode-side separator 18c of a single cell that constitutes a fuel cell according to a sixth example. As shown in FIG. 11, in the cathode-side separator 18c of the single cell of the sixth example, the widths of the power-generation channel 22 and the cooling channel 24 are changed in three stages. The cross-sectional area of each power-generation channel 22 is small on the air inlet side and the air outlet side, and is large in a middle part between the air inlet and the air outlet. The cross-sectional area of each cooling channel 24 is large on the air inlet side and the air outlet side, and is small in the middle part between the air inlet and the air outlet. Through-holes 30a, 30b are provided in side walls 26 of two stepped portions 28a, 28b at which the widths of the power-generation channel 22 and the cooling channel 24 change. The other configuration is identical with that of the first example, and therefore, will not be described.

As in the sixth example, the cross-sectional area of the power-generation channel 22 on the air inlet side may be small. In this case, too, since the cross-sectional area of the power-generation channel 22 on the air outlet side is small, the amount of air that contacts with the MEGA 20 on the air outlet side can be reduced. Also, the cross-sectional area of the cooling channel 24 on the air outlet side is large, and the through-holes 30a are provided in the side walls 26 of the stepped portion 28a; therefore, reduction of the cooling performance on the air outlet side can be curbed. Accordingly, the MEA10 is less likely to be dry on the air outlet side, and reduction of the power generation performance can be curbed.

Also, according to the sixth example, the through-holes 30b are provided in the stepped portions 28b at which the width of the power-generation channel 22 increases. With this arrangement, even when the cross-sectional area of the power-generation channel 22 on the air inlet side is small, the air flowing in the cooling channels 24 flows into the power-generation channels 22 via the through-holes 30b of the stepped portions 28b; therefore, the amount of air flowing in a portion of the power-generation channel 22 having a large cross-sectional area can be increased. Accordingly, the amount of liquid water is less likely or unlikely to be excessively large in a region of the MEA 10 corresponding to the portion of the power-generation channel 22 having the large cross-sectional area.

While some examples of the disclosure have been described in detail, this disclosure is not limited to these particular examples, but various modifications or changes may be made on the examples, within the scope of the principle of the disclosure.

What is claimed is:

1. A fuel cell comprising:
a membrane electrode assembly;
an anode-side separator and a cathode-side separator between which the membrane electrode assembly is sandwiched;
a power-generation channel provided on a first surface of the cathode-side separator which faces the membrane electrode assembly, so as to extend from a first end to the a second end of the cathode-side separator, such that oxidant gas is allowed to flow through the power-generation channel from the first end to the second end; and
a cooling channel provided on a second surface of the cathode-side separator opposite to the membrane electrode assembly, so as to extend from the first end to the second end of the cathode-side separator, such that the oxidant gas is allowed to flow through the cooling channel from the first end to the second end, the cooling channel and the power-generation channel being separated by a side wall, wherein:
a cross-sectional area of the power-generation channel on an outlet side on which the oxidant gas is discharged is smaller than the cross-sectional area of the power-generation channel at a position upstream of the outlet side of the power-generation channel, a width of the power-generation channel changes stepwise so as to be reduced in a direction of flow of the oxidant gas that flows through the power-generation channel;
a cross-sectional area of the cooling channel on an outlet side on which the oxidant gas is discharged is larger than the cross-sectional area of the cooling channel at a position upstream of the outlet side of the cooling channel; and
a through-hole is provided in the side wall that separates the power-generation channel from the cooling channel, and where the through-hole is provided in a stepped portion in which the width changes stepwise, an axis line of the through-hole is parallel to the direction of flow of the oxidant gas that flows through the power-generation channel.

2. The fuel cell according to claim 1, wherein
a cross-sectional area of the power-generation channel on an inlet side to which the oxidant gas is supplied is larger than the cross-sectional area of the power-generation channel on the outlet side, and
the cross-sectional area of the cooling channel on an inlet side to which the oxidant gas is supplied is smaller than the cross-sectional area of the cooling channel on the outlet side.

3. The fuel cell according to claim 1, wherein
the width of the power-generation channel changes stepwise in a plurality of stepped portions as the stepped portion.

4. The fuel cell according to claim 1, wherein
the cathode-side separator comprises a metal plate having recesses and projections.

* * * * *